United States Patent [19]
Huffman

[11] Patent Number: 5,325,817
[45] Date of Patent: Jul. 5, 1994

[54] ANIMAL TRAINING APPARATUS

[76] Inventor: Steven K. Huffman, 6470 Sunrise Ave., Nampa, Id. 83686

[21] Appl. No.: 150,866

[22] Filed: Nov. 12, 1993

[51] Int. Cl.$^5$ .............................. A01K 15/02
[52] U.S. Cl. ................................................ 119/839
[58] Field of Search ............... 119/702, 712, 839; 446/228, 229, 178, 179; 546/247

[56] References Cited

U.S. PATENT DOCUMENTS

| | | | |
|---|---|---|---|
| 4,601,261 | 7/1986 | Genelin | 119/839 |
| 4,738,223 | 4/1988 | Andreasen | 119/839 |
| 5,255,629 | 10/1993 | Paterson | 119/839 |

*Primary Examiner*—Thomas Price
*Attorney, Agent, or Firm*—Paul F. Horton

[57] ABSTRACT

Animal training apparatus particularly useful in the training of cutting horses to cut a cow or calf from a herd. The apparatus includes a pneumatic tube, preferably annular, mounted at a selected height above the ground by support members. The tube is provided internally with a piston which is reciprocally moveable at a desired speed and direction by compressed air fed into and removed from air ports in the tube by an air compressor. A wheeled carriage, mounted on the exterior surface of the tube, carries a second magnet, magnetically coupled to the first magnet of the piston, for movement of the carriage in concert with the piston. An artificial cow or calf downwardly depends from the carriage, serving as a stimulus for training of the horse.

17 Claims, 2 Drawing Sheets

ANIMAL TRAINING APPARATUS

BACKGROUND OF THE INVENTION

1. Field of the Invention

This invention relates, in general, to animal training devices, and, more particularly, to apparatus for the training of horses for cow cutting.

2. Description of the Prior Art

For many years, horses have been trained to "cut" cattle from a herd. Where "cutting" was once, and sometimes still is used for practical reasons, such cutting is now largely for sport.

In training the horse, historically, live cows, or calves, are brought into an arena, which is enclosed and is generally circular for limiting the movement of the cow. The horse then occupies a position toward the center of the arena and is trained in its movement to force or "cut" the cow in a desired direction about the inner periphery of the arena, or to hold the cow in a given position. Problems in the use of live cows include the expense of obtaining and maintaining the cattle, as well as a "souring" of a particular cow or calf; i.e., the cow or calf may be used only for two or three days in the training of a horse before becoming listless and not responding to the cutting procedure.

For this reason, several devices have been invented and developed for training cutting horses with the use of artificial animals, as typified by the inventions embodied in U.S. Pat. No. 3,962,995, issued to D. Brinson and U.S. Pat. No. 4,601,261, issued to G. Genelin.

The Brinson device provides an artifical calf mounted on a rotatable platform; the platform being moveable in an arc about a vertical pivot and the platform being moved forwardly and rearwardly by a telescoping extension on a boom which holds the platform. Besides being costly in construction, the Brinson apparatus is extremely confining in area covered; provides maintenance problems in having a multiplicity of moving parts; does not provide proper stimulus because of the size of the machinery relative to the size of the artificial animal; and presents safety problems because of collision possibilities between the horse to be trained and the platform holding the artificial animal.

The Genelin device is also extremely confining in area covered and, because movement of the artificial animal is constricted for movement only in a lateral to and fro direction, only one end of an arena can be effectively used. Besides utilizing only a prescribed portion of the arena, such linear movement requires the horse being trained to move completely lateral and substantially parallel to keep up with the artificial calf. In an enclosed arena, with live calf, the horse may pivot on its hind legs, moving the front legs about the pivoting rear legs to cut the calf. The action of the horse is therefore unnatural in requiring full lateral movement upon slight movement of the artificial calf. Additionally, like the Brinson device, the Genelin device includes a multiplicity of moving parts, including a gearing system; a plurality of cables; pulleys; and other mechanisms—all contributing to maintenance problems and proper stimulus problems because of the mechanics of the device.

SUMMARY OF THE INVENTION

These and other problems are solved by the present invention which comprises a pneumatic tube, preferably circular for completely surrounding the training horse; a piston, carrying a first magnet, mounted in the tube and reciprocally moveable within the tube in a selected direction and at a selected speed by compressed air from an air pump or compressor; a carriage carried by and riding on the exterior surface of the tube, the carriage carrying second magnet means, magnetically coupled to the piston magnet, for moving the carriage in concert with the piston; and an animal image, i.e., an artificial animal, carried by the carriage for eliciting a response from the horse to be trained in the cutting of cattle.

It is therefore a primary object of the present invention to provide apparatus for the training of a cutting horse which moves an animal image in a circle about the horse and rider.

More specifically, it is an object of the present invention to provide apparatus for the training of a cutting horse which may be moved in either direction and at a desired speed in a circle or arc about the horse and rider.

Even more specifically, it is an object of the present invention to provide apparatus for the training of a cutting horse in which an artificial animal may, for safety reasons, be magnetically decoupled from the apparatus providing its movement.

It is also an object of the present invention to provide apparatus for the training of a cutting horse which provides minimal distraction to the horse to be trained.

Another object of the present invention is to provide apparatus for the training of a cutting horse which has a minimum of moving parts for cost and maintenance efficiency.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
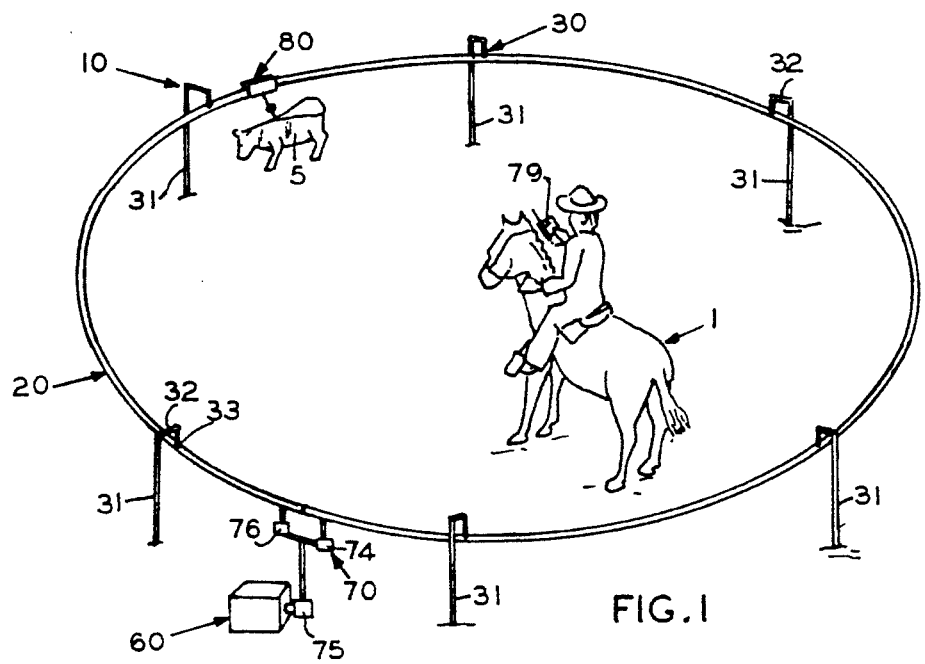
FIG. 1 is a perspective view of horse training apparatus made according to the present invention.
Figure 6:
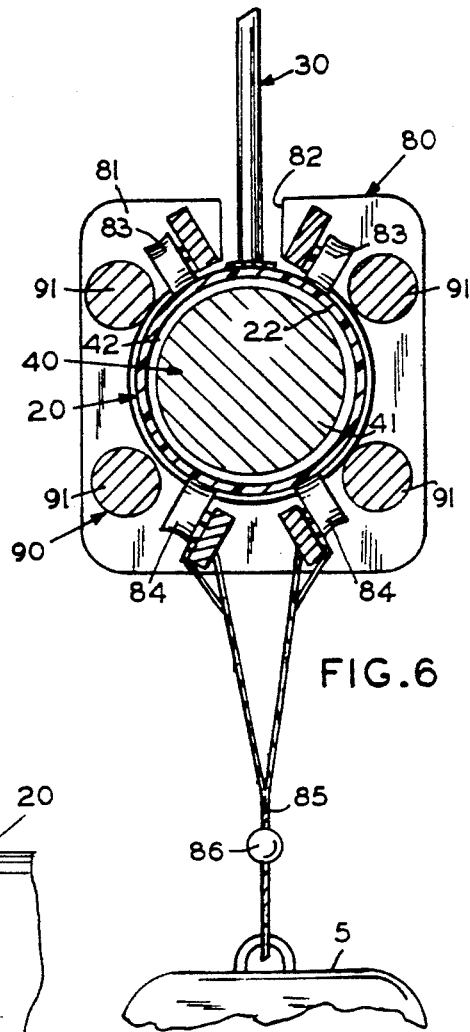
FIG. 6 is a cross-sectional view of the pneumatic tube, piston, and carriage.
Figure 5:
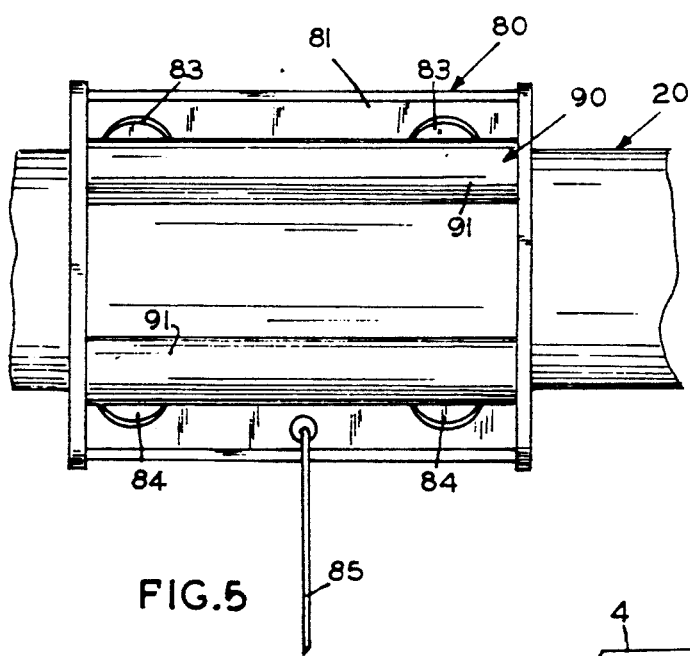
FIG. 5 is a side view of the carriage as mounted on the tube.

Referring now to the drawings, and, more particularly to FIGS. 1 and 6, an embodiment to be preferred of animal training apparatus 10, made according to the present invention is disclosed. Animal training apparatus 10 includes, generally, pneumatic tube 20; tube support means 30; a piston 40 mounted for reciprocal movement within the tube; air injection means 60 for injecting air into the tube for moving the piston; air control means 70 for controlling piston direction and speed; carriage means 80, which tracks on the exterior surface of the tube; and an animal likeness, image 5, suspended from carriage means 80 and serving as a stimulus to an animal, horse 1 being shown in the illustration.

Figure 2:
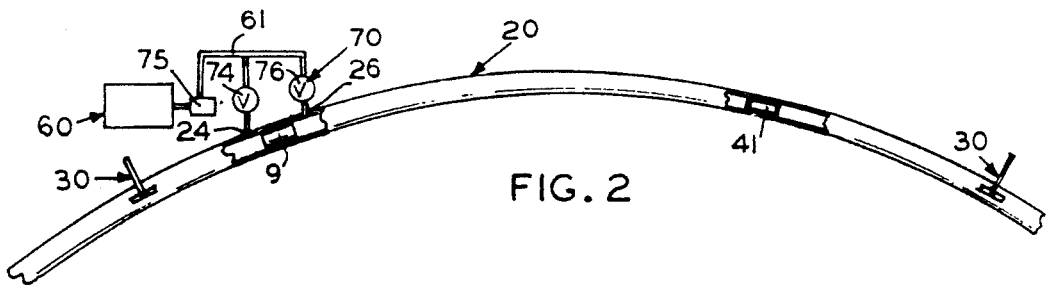
FIG. 2 is a plan view, in partial section, of the apparatus of FIG. 1.
Figure 4:
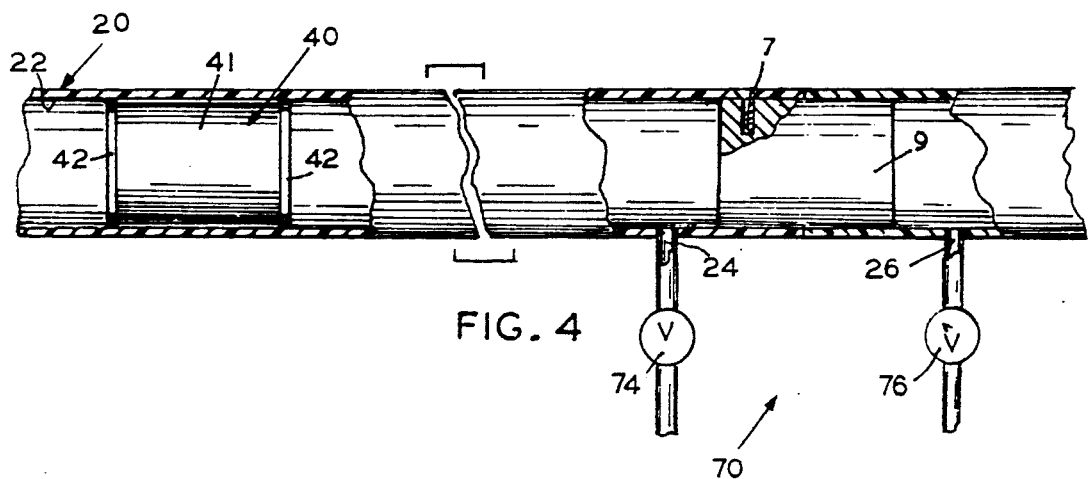
FIG. 4 is a sectional side view of a portion of the tube and piston, showing air ports.
Figure 3:
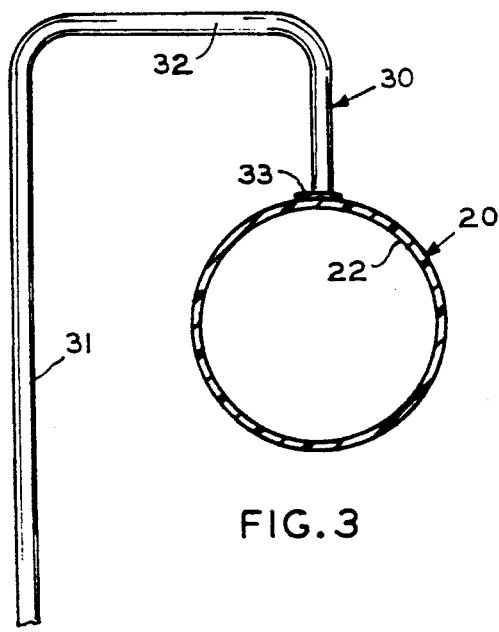
FIG. 3 is a frontal view, in partial section, showing support structure holding the pneumatic tube of the invention in place above the ground.

Pneumatic tube 20, shown to advantage in FIGS. 2, 3, and 4, is an elongated air tight tube preferably forming a circle or annulus which preferably has a diameter of from one hundred to two hundred feet, as shown in FIG. 1. It has been found, through experimentation, that, to prevent leaks and breakage, for cost efficiency, and to accommodate uneven ground, that flexible tubing made of plastic, such as polyethylene, serves the purpose well. The tubing used in experimentation was circular in cross-section, having an inside diameter of three quarters of an inch. While the tube may define any portion of a circle or may be linear, a tube which is circular, enclosing the animal to be trained, is preferred in that the entire arena about the animal, horse 1, may be utilized, allowing the horse to pivot on its hind legs, as has previously been explained. Further, when cow cutting is done as a sport, invariably the arena defines an enclosure and therefore the training received approximates the real conditions. For simplifying maintenance and for viewing the piston functioning within the tube translucent and preferably transparent tubing is preferred.

Tube 20 maybe supported by any convenient means 30, as from existing building structure or overhangs or may be supported by vertical poles 31 provided with horizontal rods 32 having downwardly depending tube retention clamps 33, as shown in FIG. 3, designed particularly for the purpose of supporting the tubing.

Referring to FIGS. 4 and 6, piston 40 will be seen to advantage. Piston 40, in the preferred embodiment, includes a single permanent high flux magnet, first magnet 41, only slightly less in diameter that the inside diameter of pneumatic tube 20 into which it is inserted and further includes a pair of sleeve type gaskets 42 disposed on opposing ends of magnet 41 on which the pistons slides in its engagement with the interior surface 22 of the tube. Gaskets 42, having an outside diameter approximating the inside diameter of the tube may be constructed of Teflon ® or any other suitable material, preferably minimizing friction between the piston and surface 22 while providing an air seal. In serving as air sealants, the piston moves in a selected direction and at a velocity dependent upon air pressure differential within the tube.

For injection of air into tube 20 and for release of air from the tube for movement of the piston, the tube is provided with at least two air ports, shown in FIGS. 2 and 4, identified by the numerals 24 and 26. Where tube 20 is circular in construction, as shown in FIG. 1, an air seal 9 is placed across the internal diameter of the tube between ports 24 and 26 to prevent backflow of air between ports, as seen in FIGS. 2 and 4. The air seal may be held in place as by screw 7. It will be seen that as air is introduced into the tube on one side of the piston, as for example through port 26, air is released or extracted from the second port, as for example port 24, causing a greater air pressure on one side of the piston that the other and hence causing the piston to move toward the lesser air pressure, or to the left, as shown in the example in FIG. 4. If air is injected through port 24 and released or extracted through port 26, then the piston will move in the opposite direction. Further, the greater the air pressure differential, the greater the speed of the piston through the pneumatic tube. Where the tube is linear or represents an arc, i.e., a portion of a circle, the ports will be placed on opposing ends of the sealed tube.

Air is injected into the tube by means of a conventional air compressor or air pump 60, preferably connected to an electrical supply source, not shown. Air from compressor 60 flows through one or more conduits 61 to the air ports, for example ports 24 and 26; the entry or exit of air from tube 20 being controlled by conventional air valves 74 and 76. An air flow regulator 75 maybe provided for controlling velocity of piston 40 through the tubing. Control means 70 may also include a hand-held or body attached transmitter 79, FIG. 2, used conventionally in remote control applications, for actuation of the valves and regulator for controlling direction and velocity of the piston within the tube. Obviously, control means 70 may likewise be controlled by manual operation of the valves and regulator, but remote control by the horse rider is much preferred.

Mounted for tracking on the exterior surface of tube 20 is carriage means 80. Carriage means 80 includes a framework 81 rotatably supporting a pair of upper wheels 83 spaced in alignment with tube 20 and a pair of lower wheels 84, each spaced directly below an upper wheel to prevent disengagement of the wheel assembly from the exterior surface of the tube. For this purpose, each wheel is concavely contoured in cross-section, as shown in FIG. 6, for engagement of the tube. Securely mounted on the carriage is second magnet means 90, which may include one or more permanent magnets 91 which are magnetically coupled with first magnet 41 of piston 40. It will be seen, then, that as piston 40, carrying first magnet 41, moves along the interior of pneumatic tube 20, as it is propelled by the air flow, that carriage 80, because of the magnetic coupling between first magnet 41 of piston 40 and second magnet means 90 of the carriage, will track along the outside surface of the pneumatic tube together and in concert with the piston in both direction and velocity. Carriage 80 includes a notch 82 along its length for by-passing supporting framework, as seen in FIG. 6.

Figure 7:
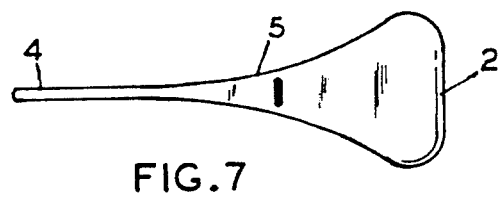
FIG. 7 is a plan view of the animal image of the present invention, showing aerodynamic characteristics.

Downwardly depending from carriage 80 is a caricature or likeness of an animal, i.e., animal image 5. Image 5, in the present embodiment shown, representing a cow or calf, serves as a stimulus for the training of the animal, which, in the present illustration, is a horse 1. Image 5 may be connected to the carriage by any suitable means, such as suspension rod 85. The image is preferably connected to rod 85 by a swivel 86 so as to be freely rotatable thereon. If desired, an over-center mechanism may be provided in combination with a swivel, which permits rotation of the image, but tends to hold the image in alignment with the tracking tube 20. Image 5 is preferably aerodynamic and three dimensional, tapering from head portion 4 to tail portion 2, as shown in FIG. 7 so as to effectively work in the manner of a wind vane so that, as the carriage and hence the depending image track along the tube, image 5 will rotate so that head portion 4 will lead tail portion 2 in the direction of movement, in the manner of a live animal, to further elicit a response from the horse. It is to be noted that the carriage and hence the image is separable from the moving piston, should contact be made between horse and image, for safety reasons. Said first magnet and second magnet means as used herein and in the appended claims is to include electromagnets as well as permanent magnets.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Training apparatus for animals, comprising:
   an elongated pneumatic tube provided with an air port for receiving air and a second air port for releasing air in and from said tube;
   tube support means for holding said tube at a selected height above ground level;
   a piston mounted within said tube for reciprocal movement therein, said piston provided with a first magnet;
   air injection means for injecting compressed air into said tube through a desired air port for movement of said piston along the length of said tube;
   control means for controlling air flow to and from said air ports for selected movement of said piston within said tube;
   carriage means mounted on an exterior surface of said tube for reciprocal movement thereon, said carriage means provided with second magnet means in magnetic engagement with said first magnet of said piston for movement of said carriage means together with the movement of said piston; and
   an animal image connected to said carriage for movement therewith for animal training.

2. The animal training apparatus as described in claim 1, wherein said pneumatic tube substantially defines a circle.

3. The animal training apparatus as described in claim 1, wherein said pneumatic tube is constructed of flexible material.

4. The animal training apparatus as described in claim 1, wherein said pneumatic tube is circular in cross-section.

5. The animal training apparatus as described in claim 1, wherein pneumatic tube is translucent.

6. The animal training apparatus as described in claim 1, wherein said piston is provided with at least one gasket in air sealing engagement with the interior surface of said tube.

7. The animal training apparatus as described in claim 1, wherein said air injection means comprises an air compressor and wherein said control means comprises one or more air valves for controlling air flow to said pneumatic tube.

8. The animal training apparatus as described in claim 1, wherein said carriage is provided with at least one wheel located above said pneumatic tube and at least one wheel located below said pneumatic tube, each of said wheels provided with tube engagement surfaces, concave in cross-section, for movement of said carriage along the exterior surface of said tube.

9. The animal training apparatus as described in claim 1, wherein said animal image is provided with a head portion and a tail portion and wherein said image is aerodynamically responsive to maintain the head portion in a leading position relative to direction of movement of the image.

10. The animal training apparatus as described in claim 9, wherein said animal image is three dimensional.

11. The animal training apparatus as described in claim 1, wherein said control means includes a remote transmitter for operation by the user to control air flow to said tube.

12. Cow cutting training apparatus for horses, comprising:
   an elongated pneumatic tube, arcuate in construction and circular in cross-section, said tube provided with an air port for receiving air and a second air port for releasing air in and from said tube;
   tube support means for holding said tube at a selected height above ground level;
   a piston mounted within said tube for reciprocal movement therein, said piston provided with a first magnet;
   air injection means for injecting compressed air into said tube through a desired air port for movement of said piston along the length of said tube;
   control means for controlling air flow to and from said air ports for selected movement of said piston within said tube;
   carriage means mounted on an exterior surface of said tube for reciprocal movement thereon, said carriage means provided with a framework having one or more wheels for tracking on an exterior surface of said tube and said carriage means provided with second magnet means in magnetic engagement with said first magnet of said piston for movement of said carriage means together with the movement of said piston; and
   a bovine image connected to said carriage for movement therewith for cow cutting training of a horse.

13. Cow cutting training apparatus for horses as described in claim 12 wherein said pneumatic tube is constructed of flexible transparent material.

14. Cow cutting training apparatus for horses as described in claim 12 wherein said piston is provided at opposing ends with an air gasket for engaging the interior surface of said tube.

15. Cow cutting training apparatus for horses as described in claim 12 wherein said air injection means comprises an air compressor.

16. Cow cutting training apparatus for horses as described in claim 12 wherein said control means includes an air flow valve for increasing or decreasing the velocity of air flow and hence the velocity of said piston within said pneumatic tube.

17. Cow cutting training apparatus for horses as described in claim 12 wherein said control means includes a remotely held transmitter for control of air flow to said pneumatic tube.

* * * * *